July 21, 1970  C. W. BUENZLI, JR  3,521,077
ELECTRICAL DISTRIBUTION SYSTEM
Filed May 8, 1969  7 Sheets-Sheet 6
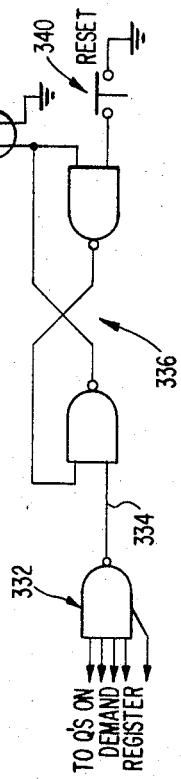
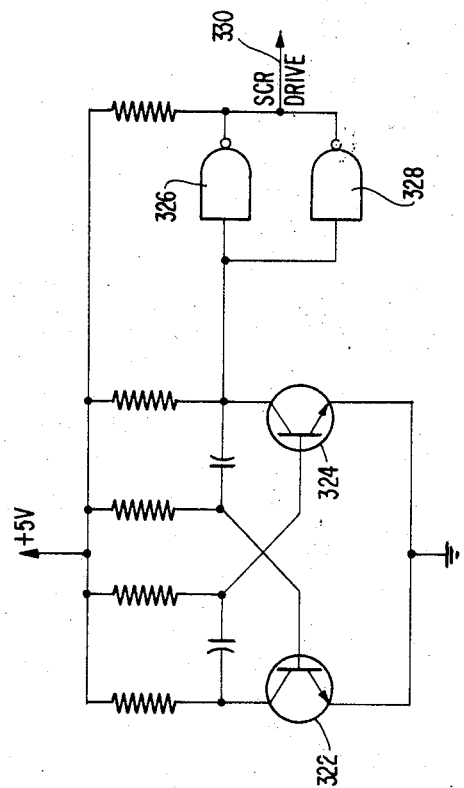
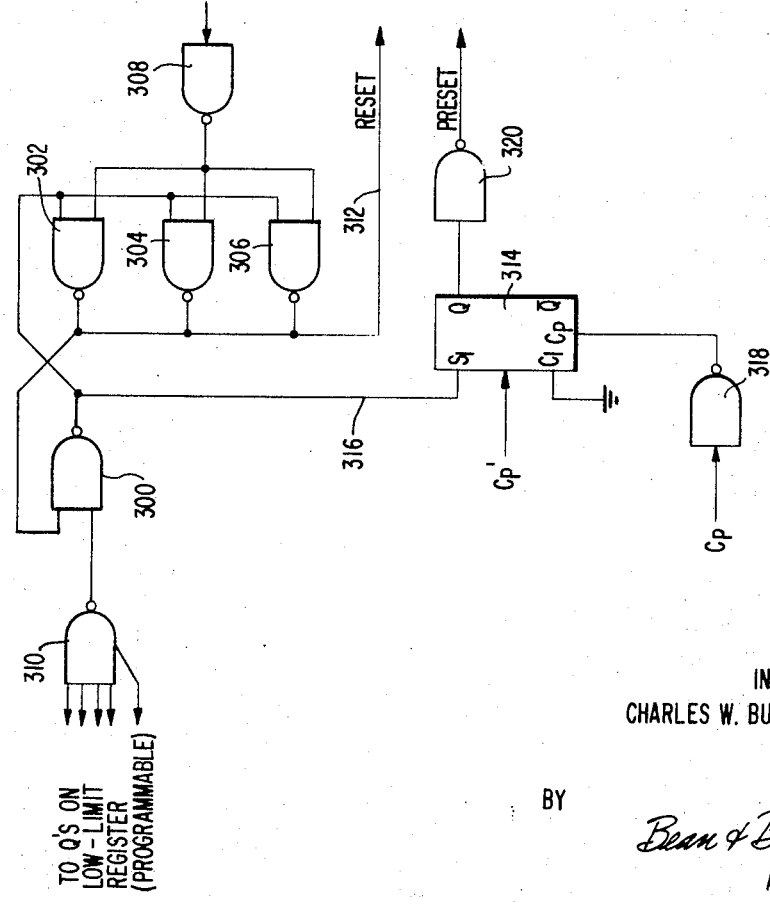
INVENTOR
CHARLES W. BUENZLI, JR.
BY
*Bean & Bean*
ATTORNEYS

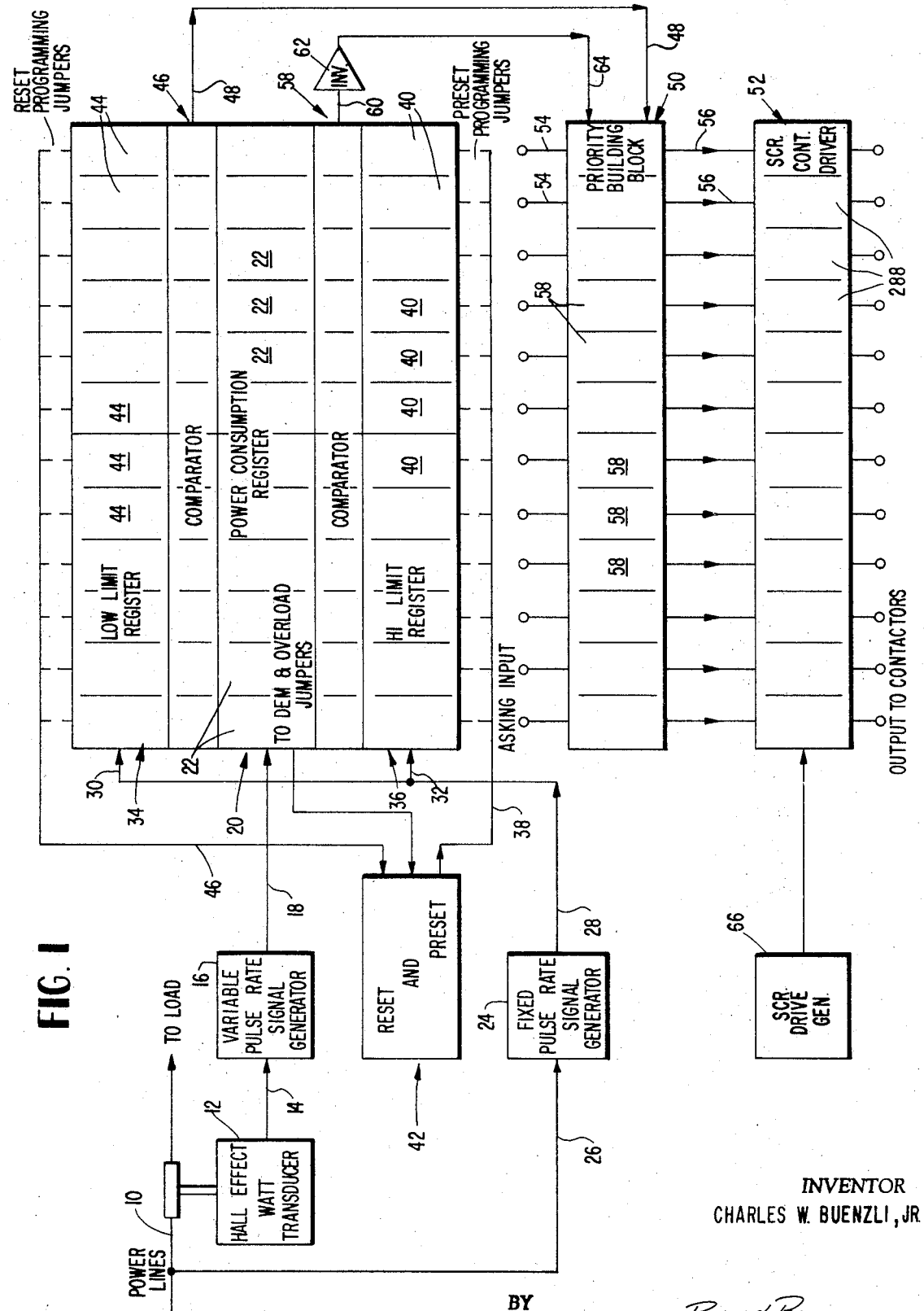

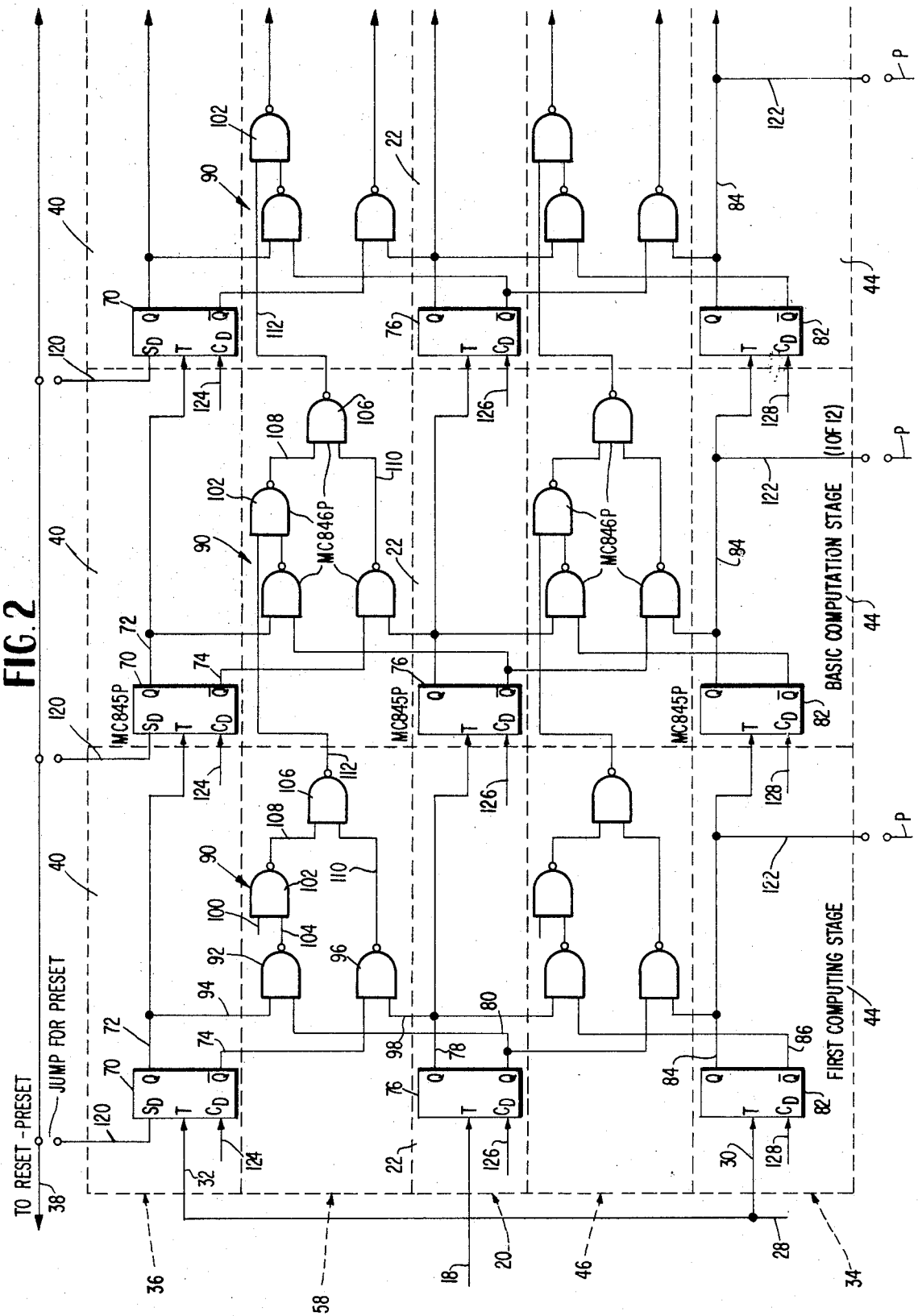

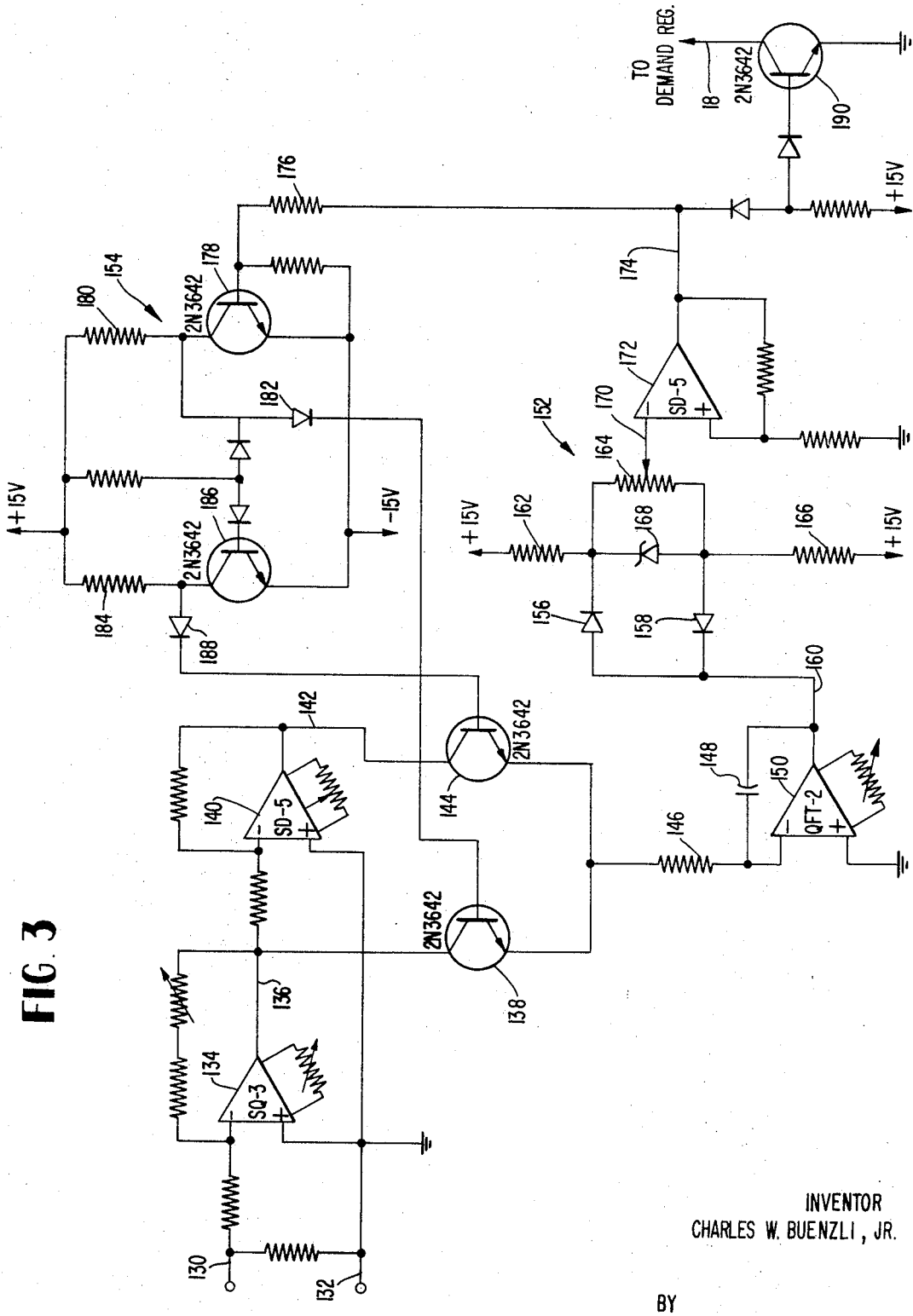

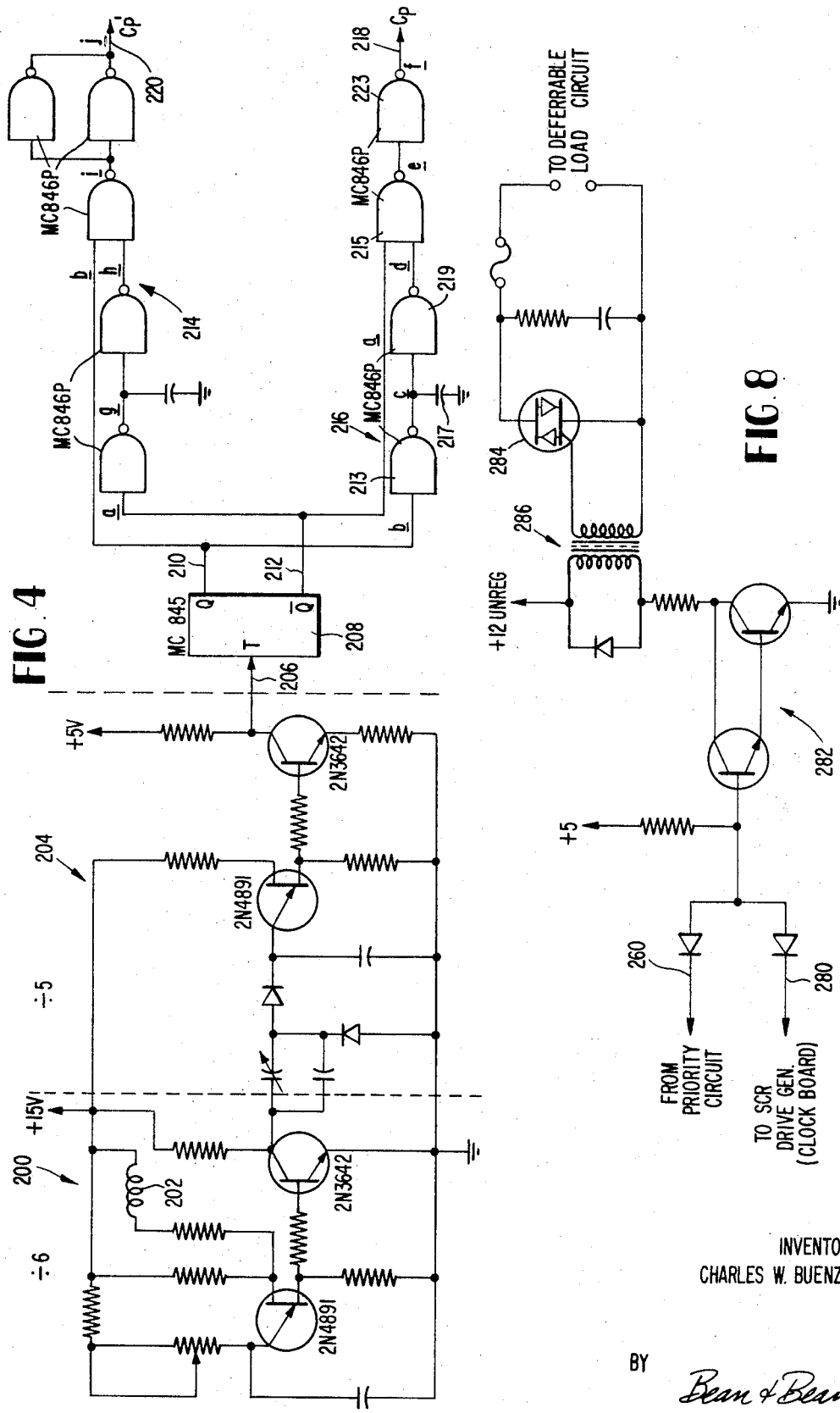

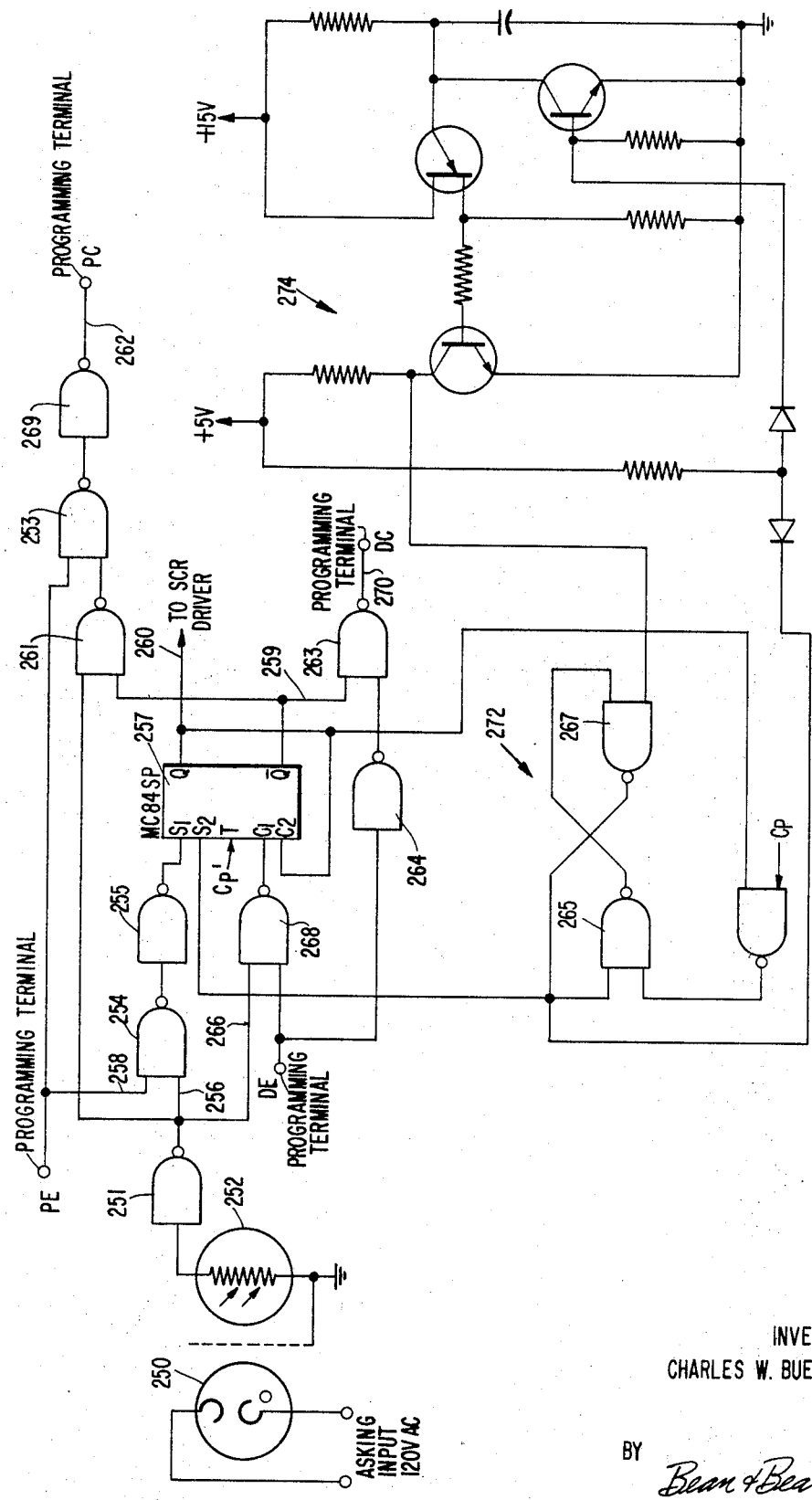

United States Patent Office 3,521,077
Patented July 21, 1970

3,521,077
ELECTRICAL DISTRIBUTION SYSTEM
Charles W. Buenzli, Jr., East Stroudsburg, Pa., assignor to The Patterson-Kelley Co., Inc., East Stroudsburg, Pa.
Filed May 8, 1969, Ser. No. 822,996
Int. Cl. H02j 3/00
U.S. Cl. 307—31                                    11 Claims

ABSTRACT OF THE DISCLOSURE

A serial binary counter driven by a signal whose pulse rate is proportional to the power consumption of the system stores a digital number which reflects the power consumption. Two other serial binary counters are driven by a clock signal having a fixed pulse rate and thereby store binary numbers according to the fixed clock rate and one of these additional counters is preset to a higher binary number than the other so that they respectively reflect high and low limits of power consumption. Comparators continuously compare the binary numbers stored in the several counters or registers and control deferrable load switching mechanism whenever the power consumption binary number exceeds the high limit or is less than the low limit.

BACKGROUND OF THE INVENTION

Figure 4A:
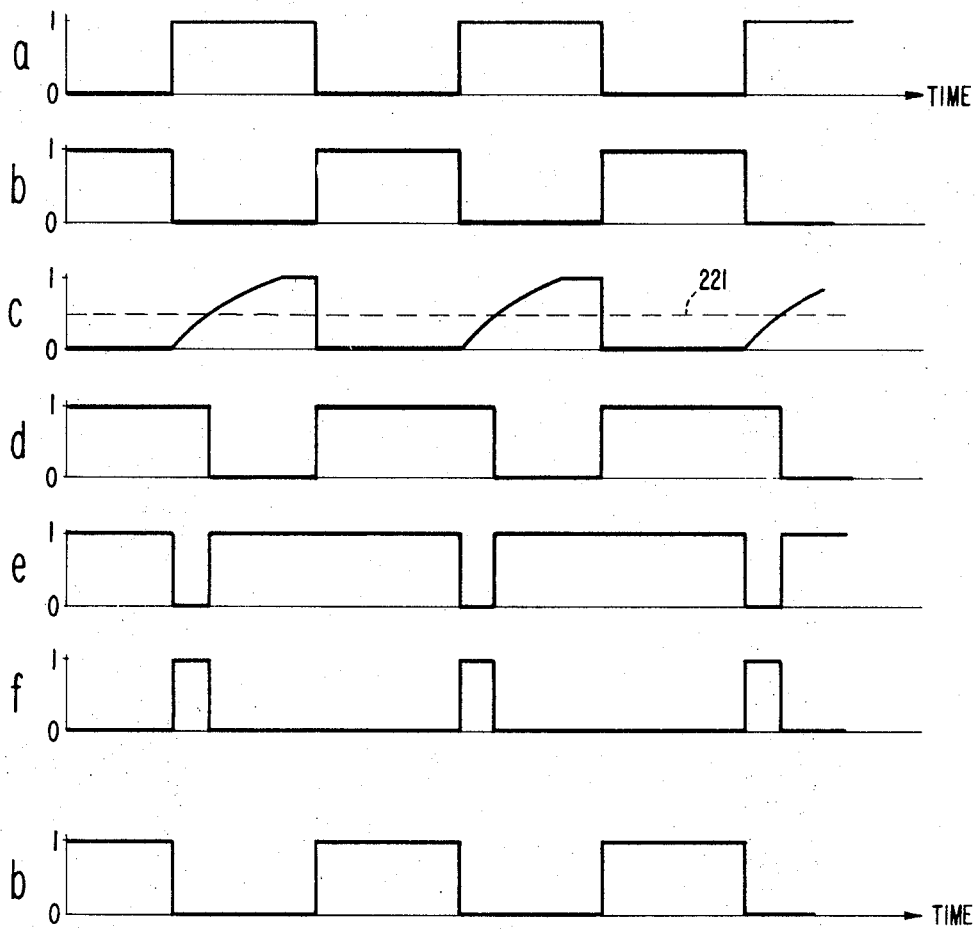

In the electrical industry charges for electric energy frequently are based on the maximum demand for electric energy over a billing period. To determine such charge, the customer's electrical load demand is monitored continuously to determine the power consumption within successive predetermined intervals. Typically, each interval may be in the order of fifteen minutes and penalty charges are assessed whenever the power consumption within any interval exceeds some predetermined maximum value.

Obviously, it would be desirable to avoid exceeding the maximum predetermined demand. At the same time, for efficient operation, it is desirable to approach the maximum demand limit within any interval. These objectives may be accomplished if the customer's loads at least in part are intermittent and are also deferrable. In such a case, the loads may be programmed to spread their power consumption so that ideally no interval occurs during which the maximum demand limit is exceeded. In practice, the ideal case may not be realized but at least the penalty charges may be minimized.

BRIEF SUMMARY OF THE INVENTION

The present invention relates to an electrical distribution system which includes at least a plurality of deferrable loads. Means is provided for continuously measuring the power consumption of the load system and this is continuously compared to high and low limit signals to control the deferrable loads, either switching them on or off in accord with the power consumption signal exceeding the high limit or being less than the low limit.

Basically, the system is associated with a source of electrical power and includes a number of loads, at least some of which are deferrable, and with there being switching means associated with such deferrable loads. Measuring means is provided for measuring the power consumed by all of the loads and this measuring means produces an output signal proportional to the time integral, starting from an initial condition, of such power consumption. This output signal, then, is related to actual power consumption. At the same time first and second signal generating means produce output signals which are functions of time starting from different initial conditions and between which, in general, it is desirable to bracket the actual power consumption signal, the measuring means and the two signal generating means being periodically reset to their respective initial conditions. The switching means for the deferrable loads are controlled according to some established progam, which itself may be varied according to changing conditions, with the programmed switching being controlled according to the value of the actual power consumption signal with respect to the signals from the two signal generating means.

More specifically, three serial binary counters or registers are provided, one of which is driven at a pulse rate proportional to the power consumption of the system and the other two of which are driven at a fixed pulse rate but one of these latter registers is preset so that it contains a higher number than the other. Comparator means operate between the register driven according to power consumption and the preset register to produce a signal whenever the binary number in the former exceeds the binary number in the preset register; and additional comparator means is associated with the register driven according to power consumption and the other fixed rate driven register to produce an output whenever the binary number in such other fixed rate driven register exceeds the binary number in the former. The two comparator signals are utilized to control switch mechanisms controlling the deferrable loads either to connect or disconnect them from the load circuit.

The register driven according to power consumption derives its variable rate signal from an integrator which is charged and discharged between fixed limits, the rate of charging and discharging being a function of the power consumption of the system and the variable rate pulse signal is determined by the attainment of the limits of the integrator.

A feature of the invention resides in the fact that the deferrable load control system may be programmed to operate the loads in serial fashion as between the extremes of least essential and most essential deferrable loads and provision is made in conjunction with each deferrable load to determine whether or not the deferrable load requires energization. If the deferrable load is asking for input, and it is next in line for being switched on, such is accomplished in accord with the signals from the several counters or registers as described or in the event no asking input is present for the next in line deferrable load, the switching control system will step to the next deferrable load having an asking input.

It is also a feature of the invention that the switching program may be altered automatically in response to changing conditions. Specifically, the order of priority of one or more loads may be altered in consequence of changing conditions which may occur. For example, if one of the deferrable loads in an apartment building is garage heating, the priority for this load may be completely eliminated at temperatures greater than some predetermined value, the priority may be low at temperatures below this predetermined value, and the priority may be increased at some predetermined low temperature. In this particular case, the garage heating would have zero priority, low priority and higher priority depending upon the ambient temperature, and the system herein may easily accommodate for such program in wholly automatic fashion.

DETAILED DESCRIPTION OF THE INVENTION

With reference at this time more particularly to FIG. 1, the power lines are diagrammatically indicated by the reference character 10 and as illustrated in FIG. 1, extend to the load system. It will be understood that the load system includes a plurality of individual loads at least some of which are deferrable as, for example, they may be industrial water heaters or the like which are thermostatically controlled for intermittent operation. Their operation, when called for, may be deferred until such time as the total load of the system is reduced sufficiently to enable their actuation without exceeding the maximum load permitted. In this respect, it will also be understood that the power company provides a billing meter on the line which measures power consumption over consecutive intervals, usually of fifteen minutes duration and this billing meter indicates the maximum power consumed during any interval and the billing is based upon this maximum power consumed in any interval in addition to the total energy consumed.

A watt transducer 12 is connected to the power lines 10 to the loads and produces an analog voltage whose level is proportional to the instantaneous power consumption and this signal is applied as indicated by reference character 14 to the assembly 16 which produces at 18 a pulse signal whose rate is variable in accord with the voltage level at 14 whereby the variable pulse rate signal generator 16 produces a pulse rate proportional to the power consumption of the system.

The variable pulse rate signal at 18 is applied to a serial binary counter indicated generally by the reference character 20 and which, as will hereinafter appear, comprises a series of individual shifting elements 22 so as to store a binary number in the register 20 which is proportional to the power consumption and thus produces an output signal which is proportional to power consumption starting from some initial condition which in the specific embodiment shown is zero.

A clock or fixed pulse rate signal generator 24 is driven in synchronization with the power source as indicated by the conductor 26 to produce, at 28, a pulse signal whose rate is fixed and this signal is branched as indicated by the reference characters 30 and 32 and applied to two further serial binary counters or registers 34 and 36, one of which, 34, functions to store a binary number which establishes a low limit signal and the other, 36, of which stores a binary number which establishes a high limit signal. The high number in the register 36 is established by means of a preset signal which is applied over conductor 38 and which may be programmed for storage into any one or a plurality of the individual shifting elements 40 of the high limit register 36, such signal being obtained from a reset-preset mechanism indicated generally by the reference character 42. The reset-preset mechanism is actuated in response to a signal pattern obtained by programming from the individual shifting elements 44 of the low limit register 34 in a manner hereinafter more particularly set forth but which, in FIG. 1, is symbolically illustrated by a single conductor connection 46 extending to the reset-preset mechanism 42.

As described thus far, then, the serial binary counter 20 is counting a binary number in proportion to the variable rate signal applied thereto at conductor 18, the low limit serial binary counter 34 is counting a binary number in accord with the fixed pulse rate signal at 28 from the clock 24 and the high limit serial binary counter 36 is counting a binary number which starts higher than the counter 34 but which is counting at the same rate.

Thus, the counters 34 and 36 produce output signals which are functions of time commencing from different initial conditions. As is hereinafter established, the initial conditions for the variable rate counter 20 and the two fixed rate counters 34 and 36 are reestablished periodically by the reset signal, so that all begin counting again simultaneously from their respective initial conditions.

Between the two conductors 20 and 34 there is provided a comparator indicated generally by the reference character 46 which is adapted to provide an output signal at 48 whenever the binary number in the low limit register 34 exceeds the binary number in the power consumption register 20 and this signal at 48 is applied to a priority building block system indicated generally by the reference character 50 which controls a switching system indicated generally by the reference character 52 for energizing one or more of the deferrable loads. In general, the deferrable loads have asking input signals applied through the asking input conductors 54 of the priority building block system 50, such asking inputs being as for example signals from thermostats or the like. The system 50 operates to serially control the deferrable loads by producing output signals at the conductors 56 whenever an output signal at 48 and simultaneously an asking input signal at 54 is present in one of the individual building blocks 58, there being also an understanding that the deferrable loads are arranged in the system from most essential to least essential and are serially operated between these extremes.

A further comparator 58 is provided to compare the binary numbers stored in the power consumption register 20 and the high limit register 36 to produce an output at 60 whenever the binary number in the power consumption register 20 exceeds the binary number in the high limit register 36. After inversion at 62, the high limit signal is applied by conductor 64 to the priority building block system 50 and operates to disable the priority building blocks 58 in a preprogrammed sequence and thus disable its output signal at 56 to turn off the associated load.

The system 52 consists of silicon controlled rectifier contactor drivers hereinafter more particularly described and this system is supplied by a silicon controlled rectifier drive generator 66 also hereinafter more particularly described.

With reference now more particularly to FIG. 2, a portion of the several serial binary counters 20, 34 and 36 and the comparators 46 and 58 are shown therein. The shifting elements 40 of the high limit register 36 will be seen to consist of the solid state flip-flops 70 having one and zero output terminals 72 and 74 respectively and the first flip-flop 70 shown at the left hand side of FIG. 2 will be seen to be connected from the branch line 32 to the clock pulse output at 28. Similar elements 76 constitute the individual shifting element 22 of the serial binary counter 20, having one and zero output terminals 78 and 80 respectively and the low limit register 34 will also be seen to constitute the flip-flops 82 comprising the various shifting elements 44 thereof having the one and zero output terminals 84 and 86 respectively.

The comparator means 58 will be seen to consist of individual logic stages 90 each of which includes a NAND gate 92 having one input terminal 94 connected to the one output terminal of the associated shifting element 70 of the high limit register 36 and another input terminal which is the zero output terminal of the shifting element 76 of the power consumption register 20. Each logic stage 90 also includes a second NAND gate 96 having one input terminal which is the output terminal 74 of the associated shifting element 70 in the high limit register 36 and the other input of which is connected as indicated by reference character 98 to the one output terminal 78 of the associated shifting element 76 of the power consumption register 20. For the first computation stage, one input 100 for the NAND gate 102 is always off and the other input is the output 104 from the NAND gate 72. the next NAND gate 106 of each stage has one input 108 which is the output of the NAND gate 102 and a further input 110 which is the output of the NAND gate 96. It will be appreciated that each stage 90 constitutes a half adder circuit which is adapted to generate a carry signal as an output 112 from the NAND gate 106 whenever both inputs 108 and 110 thereto are off. For succeeding stages 90, the carry output 112 is applied as one of the inputs to the NAND gate 102 as will be evident from FIG. 2 and the logic is such that whenever the binary number in the power consumption register 20 exceeds the binary number in the high limit register 36, a carry signal will be generated which carries through the comparator 58 and produces an output at 60 (FIG. 1)

for application to the priority building block system 50 hereinafter more particularly described.

A carry signal will be generated at 112 only when both of the inputs 108 and 110 thereto are off which can occur only if both of the inputs to the NAND gate 96 are not off and both of the inputs to the NAND gate 102 are not both off and it will be seen that under these conditions no carry signal will be generated when both numbers are the same but will be generated only when the number in the power consumption register 20 is higher than the number in the high limits register 36. It will also be seen that once the carry is generated, the succeeding stages all being at zero state which establishes an off condition for the inputs 110 of the succeeding NAND gates 106, the past carry signal to the next succeeding NAND gate 102 will not alter the off condition of the input 108 to such next succeeding NAND gate 106 so that the carry signal passes through all of the succeeding stages.

FIG. 2 also illustrates the manner in which the preset number is stored in the high limit register 36. Each of the elements 70 is provided with an input terminal 120 which, when jumped for connection with the preset signal line 38, will insert one for storage in the corresponding element 70, it being further appreciated that this preset can be programmed to insert storage into any desired number of the individual elements 70.

FIG. 2 also illustrates the reset programming system. Each of the ones output terminals 84 of the individual elements 82 in the low limit shift register 34 are provided with conductors 122 which may be jumped for connection to the individual programming conductors P which are symbolically represented by the single conductor line 46 in FIG. 1 but which in actuality are individual conductors for programming the reset mechanism 42 so as to establish a reset of all of the elements 70, 76 and 82 when the binary number in the low limit register 34 has reached some predetermined programmable number. The reset signal is not shown in FIG. 1 but the reset connections are indicated in FIG. 2 for the elements 70, 76 and 82 by the reference characters 124, 126 and 128 respectively.

FIG. 3 illustrates the variable pulse rate signal generator indicated by the block 16 in FIG. 1. The power consumption watt transducer 12 of FIG. 1 may take any conventional form and has an output producing in FIG. 3 a voltage across the conductors 130 and 132 which is proportional to the power consumption of the load system and this signal is applied to an operational amplifier 134 which amplifies this signal to produce an amplified output of the signal at 136. The amplified signal is applied to the collector of analog switch device 138 and is also applied to the unity gain amplifier 140 whose inverted output at 142 is applied to the other analog switch device 144. The condition of the analog switches 138 and 144 determines whether the non-inverted or inverted signal is applied to the up-down integrator consisting of the resistor 146, the capacitor 148 and amplifier 150. Thus, the integrator integrates either up or down depending on which of the switches 138 or 144 is operating. The integrator is caused to integrate up and down between fixed limits by means of a limit detector circuit indicated generally by the reference character 152 operating in conjunction with the digital switch circuit indicated generally by the reference character 154 for controlling the states of analog switches 138 and 144.

The detector circuit 152 comprises the oppositely poled diodes 156 and 158 connected to one side of the capacitor 148 by means of the conductor 160 to pass charging or discharging current in conjunction with the resistor 162, 164 and 166 and the Zener diode 168 which is connected across the resistor 164 causing the input 170 of the amplifier 172 to swing back and forth according to the up and down integration to swing its output voltage at 174 between extreme limits. The swinging output 174 is applied through the resistor 176 to the base of the digital switch device 178 whose load resistor 180 controls, through the diode 182, the base of the analog switch 138. The load resistor 184 of the other digital switch 186 is connected through the diode 188 to the base of the other analog switch 134 and as the output 174 swings between its limits the analog switches 134 and 138 are alternately actuated to cause the integrator to charge up and down between fixed limits. The device 190 is also connected to the amplifier output 174 to reduce its swing to micrologic signal levels and produces an output at 18 which is the variable pulse rate signal applied to the power consumption register 20. The time taken for the integrator to charge and discharge between its fixed limits is of course a function of the voltage levels of the non-inverted and inverted signals at 136 and 142 and, consequently, the signal at 18 is therefore proportional to the power consumption of the system.

Figure 4B:
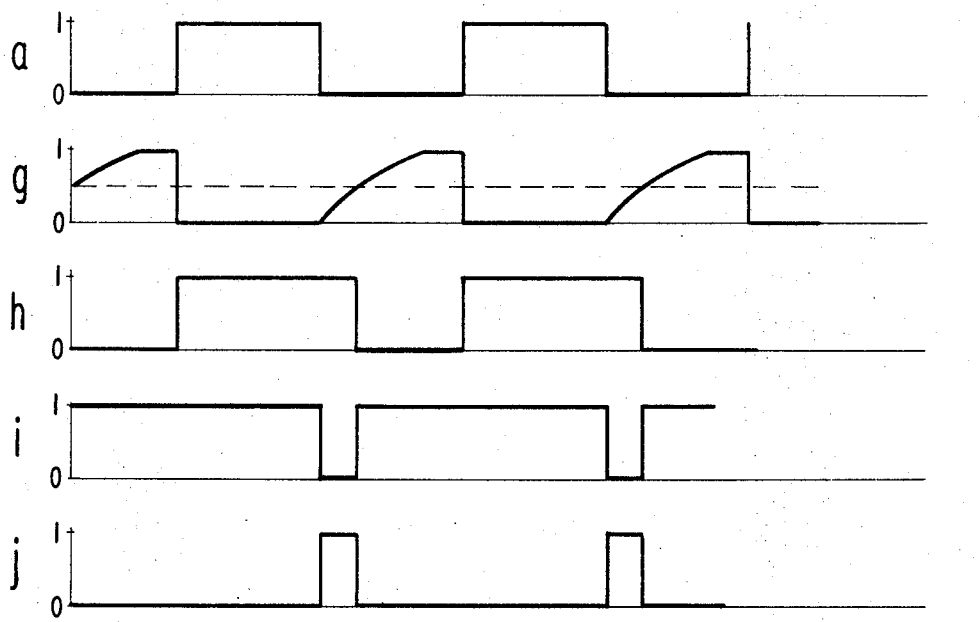

FIG. 4 illustrates the fixed pulse rate signal system which consists of a synchronized unijunction oscillator 200 synchronized by means of a transformer secondary 202 coupled to the sixty cycle power line and this oscillator operates at a basic frequency of ten cycles per second and drives a divide by five unijunction stage 204 having a two per second output at 206. This output is applied to a flip-flop 208 having its outputs 210 and 212 connected to monostable circuits 214 and 216 to produce the clock pulse at 218 and a clock generated control pulse at 220 on alternate half seconds. FIG. 4a illustrates waveforms at various points in the monostable circuit 216. As shown, the output a of the flip-flop 208 at 212 is applied to the NAND gate 215 whereas the output b is applied to the NAND gate 213. This latter gate has its output connected to the integrating capacitor 217 so that its waveform c is as shown, the threshold for the gate 219 being shown as the dotted line 221 so that its output d is as shown. The outputs a and d are applied to the gate 215 so that its output e applied to the gate 223 produces the clock pulse waveform f. Similarly, the waveforms associated with the monostable 214 are shown in FIG. 4b.

FIG. 6 illustrates one of the priority building blocks 58 in FIG. 1 and, as shown, the asking input at 54 in FIG. 1 is derived from some control device such as a thermostat at the deferrable load which operates to light a neon lamp 250 and energizes the photocell 252. This input is inverted at 251 to produce the asking input which is connected to the NAND gate 254 by means of the conductor 256. The terminal PE is connected to the next highest priority deferrable load and is connected as an input at 258 to the NAND gate 254 and also as an input to the NAND gate 253. The output of the NAND gate 254 is connected to the inverter 255 connected in turn to the flip-flop 257. The output of the inverter 251 is also connected as indicated by the reference character 262 as an input to the NAND gate 268, the other input thereto being the DE terminal which is also connected to the inverter 264. The logic of the DE terminal is negative, i.e., 0 is high. The high state of the flip-flop 257 is connected, at 260, to the SCR driver and the low output is connected, at 259, to the two NAND gates 261 and 263, the other inputs to these two NAND gates being, respectively, the output of the inverters 251 and 264.

A timer circuit comprises the flip-flop 272 and timer 274, the NAND gates 265 and 267 being connected as an R-S flip-flop so that when the flip-flop 57 goes high the flip-flop 272 is set by the clock pulse CP starting the timer 274 which, when it times out, resets the flip-flop 272.

The priority building block of FIG. 6 performs four logic functions, as follows:

(1) Flip-flop 257 goes high turning the deferrable load on through the SCR driver at 260 when the priority enable input PE is high, the asking input 250, 252 is energized, the timer 272, 274 is not timing and a clock pulse CP′ is present.

(2) A step up carry signal PC goes high to produce a priority enable signal PE for the next lower priority load when PE is high, flip-flop 257 is high or the asking input 250, 252 is not energized.

(3) Flip-flop 257 goes low turning the deferrable load off when the asking input is not energized or DE is low and Q is high plus a clock pulse CP'.

(4) A step down carry signal DC is produced when flip-flop 257 is low and DE is low.

For the first logic function, gate 254 NANDS PE and the asking input and the inverted output of this gate is applied to the flip-flop 257. Thus, if PE is high and there is an asking input, the output of the inverter 255 is high, and if simultaneously the output of the timer at 266 is high, indicating that the timer is not running, while a clock pulse CP' is present, the flip-flop 257 goes high to actuate the associated load through the SCR driver.

For the second logic function above, the gate 261 NANDS the asking input and $\bar{Q}$ and the output of this gate is fed into the gate 253 which NANDS it with PE.

For the third function, the gate 268 NORS the asking input with DE so that if the asking input is not on, with DE low the output of the gate 268 is high, with the flip-flop 257 ANDING Q with the output of gate 268.

For function four, the gate 264 inverts the DE signal and gate 263 NANDS $\overline{DE}$ with $\bar{Q}$.

The reset, preset circuit is shown in FIG. 5 and as indicated the gates 300, 302, 304 and 306 are connected as an R-S flip-flop which is reset by a CP' pulse through the inverter 308 and is set by the gate 310 which is connected to the low limit register upon attainment of a certain binary number therein. The flip-flop remains set until preset one half second later by the CP' pulse to thereby generate a one half second reset pulse at 312. The CP' pulse also causes the J-K connected flip-flop 314 to set Q high if the reset pulse is present at 316 and the flip-flop 314 is reset by a CP pulse inverted by the inverter 318 one half second later. The Q output of the flip-flop 314 is inverted by the gate 320 providing a one-half second preset pulse which follows the end of the reset pulse with a delay of one clock pulse width.

The Triac drive generator is shown in FIG. 7 and, as illustrated therein, the two transistors 322 and 324 form an astable multivibrator which freeruns at approximately 2 kc. with a 10% duty cycle. The gates 326 and 328 serve as power buffers and inverters so that a pulse 50 microseconds wide at 2 kc. rate is fed to the Triac drivers at the conductor 330.

As shown in FIG. 8, the Triac 284 is controlled by the input 260 from the priority circuit of FIG. 6 and the input 330 from the drive generator of FIG. 7. When the input 260 is high, the waveform of the input 330 is amplified by the amplifier 282 and applied to the Triac 284 through the pulse transformer 286 so that the Triac 284 is on when the input 260 from the priority circuit is high.

With reference now to FIG. 9, the inputs to the gate 332 are connected to selected Q's of the power consumption register 20 of FIG. 2 so that the output 334 of the gate 332 goes low when the selected number is reached in such power consumption register. When the output 334 goes low, the R-S flip-flop 336 is set and the overload indicator lamp 338 is energized. Reset is accomplished by the manual pushbutton switch 340.

The overload indicator feature of FIG. 9 performs a very useful practical function in that it allows the operator to program the gate 332 to a number slightly higher, say 2%, than the demand set point as established by the preset number in the high limit register 36. If the overload lamp 338 is energized, it informs the operator that the preset number is too low. In this fashion, the operator may obtain optimal presetting by starting below his estimated demand and increasing the preset to the high limit register in small increments until the overload lamp 338 does not light. Also, the lamp 338, by monitoring the maximum state of the power consumption register during each interval, allows some check on the operation of the system and thus provides some built-in failure analysis.

What is claimed is:

1. In an electrical power distribution system including an electrical power source and a plurality of loads for connection to said source at least some of which are deferrable, and including switching means for selectively controlling power consumption by said deferrable loads, measuring means for measuring power consumption by said loads starting from an initial condition to produce an output signal proportional to the time integral of such power consumption from such initial condition, first generating means for generating an output signal which is a function of time commencing from an initial condition, second generating means for generating an output signal which is a function of time having a different initial condition from the initial condition of said first generating means, means for periodically establishing said initial conditions of said first generating means, said second generating means and said measuring means, program means for actuating said switching means according to some logical program, and means for controlling said program means in accord with the values of said output signals of said first and second generating means relative to the output signal of said measuring means during any given time interval between establishment of said initial conditions.

2. In an electrical power distribution system as defined in claim 1 wherein said first and second generating means produce output signals which increase with time at the same rate.

3. The electrical power distribution system according to claim 2 wherein said first and second generating means are driven by a clock having a fixed pulse rate output and said measuring means is driven by a pulse generator having a pulse rate output which varies with the power consumed by said loads.

4. The electrical power distribution system according to claim 3 wherein said means for controlling said program means comprises a first comparator for producing one output when said output of the measuring means exceeds that of said second generating means and a second comparator for producing another output when said output of the measuring means is less than that of said first generating means.

5. In an electrical power distribution system including an electrical power source and a plurality of loads for connection to said source at least some of which are deferrable, and including switching means for selectively controlling power consumption by said deferrable loads, a clock having an output terminal producing a pulse signal whose rate is fixed, variable pulse signal means for producing an output pulse signal whose rate is proportional to the power consumption of said loads of the system, first and second serial binary counters connected to the output terminal of said clock for generating binary numbers proportional to the pulse rate of the clock signal, means for presetting said first serial binary counter to a number higher than that of the second serial binary counter, a third serial binary counter connected to the output of said variable pulse signal means for generating binary number proportional to the pulse rate of such signal output, first comparator means connected to said first and third serial binary counters for producing an output when the binary number in said third serial binary counter exceeds that in said first serial binary counter, second comparator means connected to said second and third serial binary counters for producing an output when the binary number in said second serial binary counter exceeds that in said third serial binary counter, control means for switching said deferrable loads on and off according to the outputs of said first and second comparator means, and means for periodically resetting said binary counters.

6. The electrical distribution system according to claim 5 wherein said vairable pulse signal means comprises an integrator, means for charging and discharging said integrator between fixed limits, and means for producing a pulse output signal the rate of which is determined by attainment of said limits.

7. The electrical distribution system according to claim 6 wherein said means for charging and discharging said integrator comprises a watt transducer having a voltage output proportional to the power consumption of said system, analog switch means for alternately applying the non-inverted and inverted output of the watt transducer to said integrator, limit detector means for detecting said limits of the integrator, and digital switch means controlled by said limit detector means for controlling said analog switch means.

8. In an electrical power distribution system of the type including a power source, a billing meter associated with the power source for measuring power consumption during successive intervals each of predetermined duration, and a plurality of electrical loads some of which are deferrable and including switching mechanism for controlling power consumption by such deferrable loads, the improvement comprising, a demand register for progressively registering a binary number according to the actual power consumption by said loads during each said successive intervals, a high limit register, a low limit register, means for progressively registering binary numbers in said high and low limit registers as a function of time during each of said successive intervals, reset means for resetting the demand, low limit and high limit registers to an initial condition at the end of each interval, said reset means being actuated by said low limit register upon attainment therein of a predetermined binary number, the initial condition of said high limit register being a binary number greater than the binary numbers constituting the initial conditions of said demand and low limit registers, first comparator means for generating a signal when the binary number in said low limit register is greater than the binary number in said demand register, second comparator means for generating a signal when the binary number in said demand register is greater than the binary number in said high limit register, and means actuated by the signals from said first and second comparator means for controlling the switching mechanisms of said deferrable loads.

9. In the system as defined in claim 8 wherein the last mentioned means includes first input terminal means connected with the signal output of the first comparator means, second input terminal means connected with the signal output of said second comparator means, third input terminal means for receiving a demand signal from an associated deferrable load, first output terminal means for energizing an associated deferrable load when signals are present at said first input terminal means and at said third input terminal means and for deenergizing said associated deferrable load when signals are present at said second input terminal means and at said third input terminal means.

10. In the system according to claim 9 wherein said last mentioned means also includes second and third output terminal means connected to first and second input terminal means associated with another deferrable load for controlling the other deferrable load sequentially after the first deferrable load.

11. In an electrical power distribution system, in combination, a plurality of loads including deferrable loads each having control mechanism for producing a demand signal, means for producing a pulse output signal whose rate is a function of power consumption by said loads, first means for adding said pulse output signal to establish a demand reference signal which increases in proportion to the time integral of power consumption by said loads, clock means for generating a pulse output signal whose rate is fixed, second means for adding the pulse output signal of said clock means to establish a minimum ideal reference signal which increases with time, third means for adding the pulse output signal of said clock means to establish a maximum ideal reference signal which increases with time, comparator means connected to said first, second and third means and having one output when said minimum ideal reference signal is greater than said demand reference signal and having a second output when said demand reference signal is greater than said maximum ideal reference signal, means for selectively energizing said deferrable loads, and having said outputs of the comparator means and said demand signals as inputs thereto, and means for periodically resetting said first, second and third means.

References Cited

UNITED STATES PATENTS

| 3,173,002 | 3/1965 | Starr | 307—57 X |
| 3,387,121 | 6/1968 | Maczuzak et al. | 307—57 X |
| 3,392,272 | 7/1968 | Stadlin | 307—57 X |

ROBERT K. SCHAEFER, Primary Examiner

H. J. HOHAUSER, Assistant Examiner

U.S. Cl. X.R.

307—87